July 13, 1965  C. ORT  3,194,136
CINE CAMERA WITH REFLEX FINDER
Filed Nov. 15, 1962
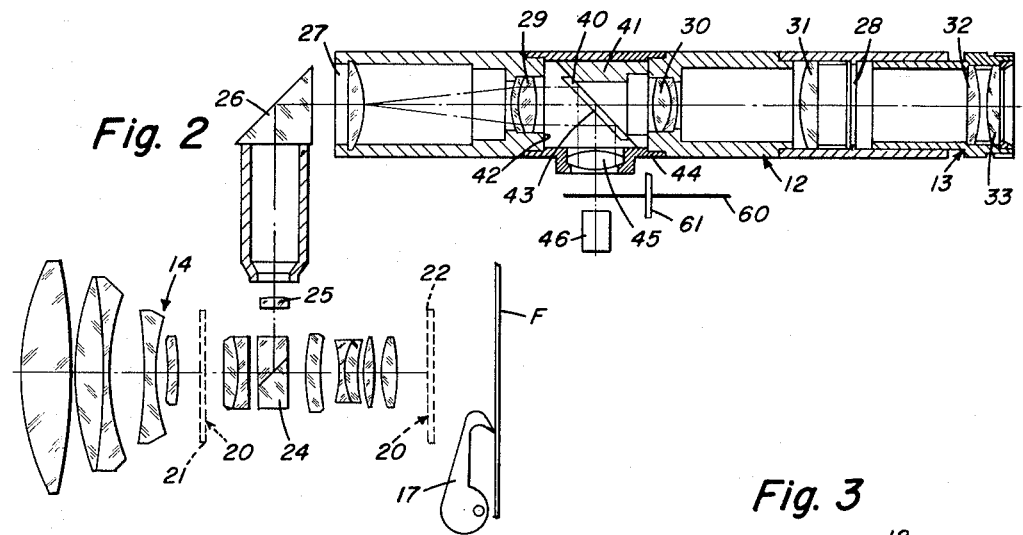
Fig. 2
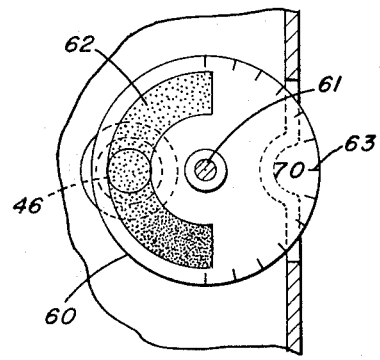
Fig. 5
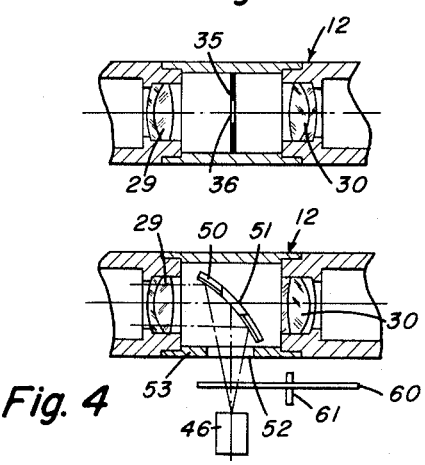
Fig. 3
Fig. 4
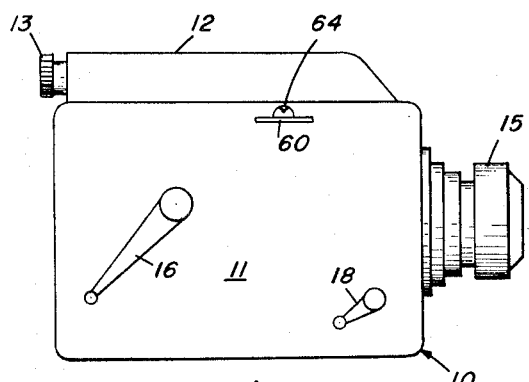
Fig. 1
CARL ORT
INVENTOR.
BY
ATTORNEY & AGENT

United States Patent Office 3,194,136
Patented July 13, 1965

3,194,136
CINE CAMERA WITH REFLEX FINDER
Carl Ort, Stuttgart-Bad Cannstatt, Germany, assignor to Eastman Kodak Company, Rochester, N.Y., a corporation of New Jersey
Filed Nov. 15, 1962, Ser. No. 237,832
7 Claims. (Cl. 95—10)

The present invention relates to photographic cameras, and more particularly to a cine camera having a reflex finder in which part of the scene light transmitted through the taking lens system is directed into the finder system and is used both for viewing and energizing a photoelectric exposure control system.

Cine cameras which use scene light that is transmitted through the taking lens system for energizing a photoelectric exposure control system are known in the art. Such cameras embody a reflecting surface, usually a part of the camera shutter, for directing the light incident thereon via a beam splitter to the finder system and the photocell in the exposure control system. A lens system is usually employed to focus the light from the beam splitter onto the photocell. In such a light transmission system, the surface of the shutter that serves as a reflector must be very smooth and either highly polished or silvered in order to provide a first order reflecting surface that does not scatter the light incident thereon. The cost of producing such a surface together with the necessary lens system for focusing the light on the photocell prohibits use of such an arrangement in relatively inexpensive cameras.

In cine cameras having a reflex type finder in which an erecting lens system forms a part of such finder, a relatively simple expedient can be used to direct scene light to a photocell for energizing a photoelectric exposure control system. It is well known to position a diaphragm between the spaced elements of an erecting lens system. Such a diaphragm determines the diameter of the exit pupil of the finder and, as is well known, the size of the exit pupil has to be adapted to that of the human eye which is comparatively small. For full illumination of the finder system, the diameter of the erecting lens system has to be much larger than that of the aperture in the diaphragm. As a result, only part of the light transmitted by the erecting lens system is actually required for the finder image, that is, only that part which passes through the aperture in the diaphragm.

In the present invention, the light that is normally blocked by the diaphragm is used to energize the photoelectric exposure control system. This is accomplished by replacing the usual diaphragm with a planar diaphragm having a reflecting surface and a central aperture. Such a planar diaphragm is arranged at an angle to the optical axis of the erector lens system to direct the part of the light that is normally blocked by the conventional diaphragm to the photocell arranged outside of the finder housing. In order to concentrate this directed light onto the photocell, a collecting lens can be interposed between the diaphragm reflector and the photocell. The directed light can also be focused onto the photocell by the diaphragm itself if the latter is made spherical in shape and properly positioned in the light path.

The primary object of the invention, in a camera having a reflex finder and a photoelectric exposure control system, is to use the scene light directed through the finder to energize a photoelectric control system in the camera as a function of scene brightness.

Another object of the invention, in a camera having a reflex finder and a photoelectric exposure control system, is to provide an apertured reflecting diaphragm in the erecting system of the finder for using the scene light that is normally blocked from transmission to the finder eyepiece to energize an exposure control system in the camera as a function of scene brightness.

These and other objects and advantages will be readily apparent to those skilled in the art when the following description is read in conjunction with the accompanying drawing wherein like reference numerals designate like parts and:

FIG. 1 is a side elevation of a cine camera embodying the invention;

FIG. 2 is a partial vertical sectional view taken through a cine camera and showing the interrelationship of the taking lens system, the finder system and the photocell for the exposure control system;

FIG. 3 is a partial vertical sectional view taken through that portion of the finder in which the erecting lens system is arranged and showing the arrangement of a conventional diaphragm in such system;

FIG. 4 is a partial vertical sectional view, similar to FIG. 3, and showing a diaphragm arranged in the erecting lens system for focusing scene light on the photocell; and FIG. 5 is a plan view of a grey density wedge and shows the relation of such a wedge to the photocell and the manner in which the wedge can be mounted for rotation relative to the photocell for varying the sensitivity thereof.

With reference to FIG. 1 of the drawings, a camera 10 comprises a casing or housing 11 on the top of which is mounted the reflex finder 12 having a focusing eyepiece 13. The taking lens system 14 is contained in a suitable mount 15 which is mounted on the front wall of housing 11 in a well-known manner. Handle 16 is utilized to tension the spring motor that is the source of power for advancing the photosensitive material F, as shown in FIG. 2, by means of an eccentrically mounted claw member 17 which, in turn, is interconnected to the spring motor by a suitable drive mechanism. Likewise, lever 18 is interconnected to the drive mechanism for releasing the drive mechanism to permit intermittent advancement of the film by claw member 17.

The taking lens system 14 comprises a multiple element lens system having a diaphragm 20 arranged between the elements, as indicated by numeral 21, or between the last element of system 14 and the film F, as indicated by numeral 22. The diaphragm can be of the type shown in U.S. Patents 3,013,480 or 3,024,715 and comprises part of the exposure control system disclosed in these patents which also includes a photocell and an electrical measuring instrument, the electrical measuring instrument being energized by light incident on the photocell and moving the vanes of the diaphragm to establish an exposure opening as a function of scene brightness. Lens system 14 also includes a beam splitting prism 24 that reflects part of the light into the finder system 12 and transmits part of the light to the film F. A suitable shutter (not shown) is rotatably mounted adjacent film F and driven in synchronism with the movement of the film as known in the art.

By way of finder lens 25 and prism 26, lens 25 produces an inverted and laterally reversed image in a first image plane designated by the numeral 27 in FIG. 2. This image is reverted to a true and erect real image in the image plane 28 by the erecting lens system comprising spaced elements 29 and 30. The eyepiece comprises elements 31, 32 and 33, and elements 32 and 33 are movable axially as a unit in casing 11 for the purpose of focusing, the eyepiece forming an erect virtual image that is observed by the viewer.

With reference to FIG. 3, a diaphragm 35 having an aperture 36 is usually arranged between elements 29 and 30 so as to block out all undesired light. The diameter of aperture 36 determines the diameter of the exit pupil of the finder and since the diameter of the exit pupil has to be compatible with that of the human eye, it is comparatively small. However, the diameter of the erecting lens system must be considerably larger than that of aperture 36 if the finder window is to be fully illuminated. Accordingly, part of the light is transmitted through aperture 36 to eyepiece 13 and part is blocked by diaphragm 35.

As shown in FIG. 2, diaphragm 40 is arranged between elements 29 and 30 of the erecting lens system, this diaphragm being arranged at an angle and retained on the face of support member 41 which positions the diaphragm relative to an opening 42 in the finder casing. The diaphragm 40 is provided with a small aperture 43 and the face of said diaphragm is silvered or polished so as to form a first surface reflector for directing the light which cannot pass through aperture 43 into opening 42. A mount 44 for collective lens 45 is secured in opening 42, the collective lens focusing the light incident on diaphragm 40 onto photocell 46.

The light that is focused on photocell 46 is part of the scene light that is transmitted by taking lens 14 when the camera is pointed at the object or scene and reflected into the finder lens system by beam splitter 24. With energization of photocell 46, the resulting electrical energy is utilized to drive the coil of the measuring instrument which, in turn, deflects or rotates its output member which, in conjunction with diaphragm 20, establishes an exposure opening as a function of the scene brightness.

In the embodiment of the invention disclosed in FIG. 4, the diaphragm 50 is arranged between elements 29 and 30 of the erecting lens system and is provided with an aperture 51 as described above. However, the collective lens 45 is not used in this instance because the diaphragm 50 is curved spherically and focuses the light incident on the reflecting surface thereof directly through opening 52 in plate 53 and onto photocell 46.

In order to change the sensitivity of the photocell 46 as a function of the speed or sensitivity of the photosensitive material that is being exposed, a disc 60 having a grey scale of graduated or continuous density or a series of apertures of different sizes is rotatably mounted between collective lens 45 and photocell 46 or adjacent photocell 46 as shown in FIGS. 2 and 4. Such a disc can be rotatably mounted within the camera housing and having a knob outside of the housing fixed to its shaft 61, or can have a portion of its periphery extending outside of the camera housing, as shown in FIG. 5. The disc can be provided with a grey scale 62 which is moved relative to photocell 46 as the film speed scale 63 is moved relative to index 64 on the casing, see FIG. 1. By the use of a grey scale or a series of apertures of different diameters, the amount of light incident on photocell 46 can be readily varied and, hence, the sensitivity of photocell 46.

It will be readily apparent to those skilled in the art that if interchangeable lenses are used on a camera such as described herein, that each such lens has a different field angle in accordance with the focal length thereof. However, any change in the field angle of the lens will result in a corresponding change in the amount of light transmitted by taking lens 14 and in the amount of light directed to the finder system, thereby affecting the amount of light incident on the photocell. As a result, the invention described hereinabove does not necessitate any compensatory arrangement for interchangeable lenses.

While the invention has been described with respect to a cine camera, it should be evident that it is not to be so limited but is equally applicable to any type of camera having a reflex finder in which an erecting lens system is used. The invention is, therefore, not to be limited to the embodiments disclosed herein but is of a scope as defined by the appended claims.

I claim:

1. In a camera having a taking lens system arranged along an optical axis for focusing an image of a viewed scene onto a photosensitive material, a reflex finder system, and a photoelectric exposure control system for regulating the exposure of said photosensitive material, said control system comprising an electric measuring instrument, a photocell energizable by scene light for energizing said measuring instrument, and a movable diaphragm member responsive to energization of said measuring instrument for establishing an exposure opening as a function of scene brightness; the combination comprising:

means disposed in cooperation with said lens system for directing part of said scene light into said finder system; and a reflector disposed in cooperation with said finder system and provided with a central aperture, said reflector being positioned to direct part of said scene light in said finder system to said photocell and said aperture being located to pass part of said scene light in said finder system to the rest of said finder system.

2. A camera in accordance with claim 1 wherein said finder system includes an erecting lens system comprising spaced optical elements disposed between said two image planes and said reflector is disposed between the elements of said erecting lens system.

3. A camera in accordance with claim 2 wherein said reflector is provided with a spherical reflecting surface for focusing part of said scene light in said finder system to said photocell.

4. A camera in accordance with claim 1 including a collective lens system interposed in the light path between said second means and said photocell for focusing the directed part of said scene light from said finder system onto said photocell.

5. A camera in accordance with claim 1 including a light controlling means interposed between said reflector and said photocell for varying the sensitivity of said photocell in accordance with the speed of said photosensitive material.

6. A camera in accordance with claim 4 including a movable neutral grey wedge of graduated density interposed between said collective lens system and said photocell for varying the sensitivity of said photocell in accordance with the speed of said photosensitive material.

7. In a camera having a taking lens system arranged along an optical axis for focusing an image of a viewed scene onto a photosensitive material, a reflex finder system having two real image planes and an erecting lens system comprising at least two spaced optical elements disposed between said image planes, and a photoelectric exposure control system for regulating the exposure of said photosensitive material, said control system comprising an electric measuring instrument, a photocell energizable by scene light for energizing said measuring instrument, and a movable diaphragm member responsive to energization of said measuring instrument for establishing an exposure opening as a function of scene brightness; the combination comprising:

beam splitting means disposed in said taking lens system for directing part of said scene light into said finder system and transmitting part of said scene light to said photosensitive material;

reflector means disposed between the elements of said erecting lens system and provided with a central aperture, said reflector means directing part of said scene light in said finder system to said photocell and said aperture passing part of said scene light to the rest of said finder system;

a collective lens system interposed in the light path between said reflector means and said photocell for focusing the directed part of said scene light in said finder system onto said photocell; and a movable neutral grey wedge of graduated density interposed between said collective lens system and said photocell for varying the sensitivity of said photocell in accordance with the speed of said photosensitive material.

References Cited by the Examiner

UNITED STATES PATENTS

| | | | |
|---|---|---|---|
| 3,017,813 | 1/62 | Greger | 95—10 |
| 3,060,823 | 10/62 | Nelson | 95—10 |

OTHER REFERENCES

German Printed Application, 1,126,243, March 22, 1962.

EVON C. BLUNK, *Primary Examiner.*

EMIL G. ANDERSON, *Examiner.*